(12) United States Patent
Hu

(10) Patent No.: US 9,268,447 B2
(45) Date of Patent: Feb. 23, 2016

(54) TOUCH DISPLAY PANEL, TOUCH DISPLAY DEVICE AND DRIVING METHOD THEREOF

(71) Applicant: HIMAX TECHNOLOGIES LIMITED, Tainan (TW)

(72) Inventor: Chia-Wei Hu, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 148 days.

(21) Appl. No.: 14/025,471

(22) Filed: Sep. 12, 2013

(65) Prior Publication Data
US 2014/0333572 A1   Nov. 13, 2014

Related U.S. Application Data

(60) Provisional application No. 61/822,898, filed on May 13, 2013.

(51) Int. Cl.
*G06F 3/044* (2006.01)
*G06F 3/041* (2006.01)

(52) U.S. Cl.
CPC .............. *G06F 3/044* (2013.01); *G06F 3/0412* (2013.01); *G06F 3/0418* (2013.01)

(58) Field of Classification Search
CPC ........ G06F 3/041–3/04897; G06F 2203/04111
See application file for complete search history.

(56) References Cited

U.S. PATENT DOCUMENTS

| | | | | |
|---|---|---|---|---|
| 2012/0105381 A1* | 5/2012 | Lee | ........................ | G06F 3/0412 345/176 |
| 2012/0105752 A1* | 5/2012 | Park | ..................... | G02F 1/13338 349/33 |
| 2012/0113339 A1* | 5/2012 | Park | ........................ | G06F 3/044 349/33 |
| 2012/0218482 A1* | 8/2012 | Hwang | ................... | G06F 3/044 349/12 |
| 2013/0044074 A1* | 2/2013 | Park et al. | ..................... | 345/174 |
| 2014/0184533 A1* | 7/2014 | Park | ...................... | G06F 3/0412 345/173 |
| 2014/0327840 A1* | 11/2014 | Kim et al. | ....................... | 349/12 |

(Continued)

FOREIGN PATENT DOCUMENTS

| KR | 20120004232 | 1/2012 |
|---|---|---|
| TW | 201239844 | 10/2012 |

(Continued)

OTHER PUBLICATIONS

"Office Action of Taiwan Counterpart Application", issued on Oct. 15, 2015, p. 1-p. 3.

*Primary Examiner* — Gene W Lee
(74) *Attorney, Agent, or Firm* — J.C. Patents

(57) ABSTRACT

A touch display panel including a first substrate, scan lines, data lines, a second substrate, a display medium, a second electrode set and a patterned-common-electrode layer is provided. The scan lines and the data lines are disposed on the first substrate and at least parts of the data lines form a first electrode set including first electrode subsets. The second substrate opposite to the first substrate has a top surface and a bottom surface facing the first substrate. The display medium is sandwiched between the first and the second substrates. The second electrode set disposed on the second substrate includes second electrode subsets arranged along a second direction intersected with the first direction. The patterned-common-electrode layer includes openings is disposed between the first and the second electrode sets. An orthogonal projection of the openings is overlapped with that of the first and the second electrode subsets.

23 Claims, 6 Drawing Sheets

(56) References Cited

U.S. PATENT DOCUMENTS

2015/0022500 A1* 1/2015 Kita et al. ............. 345/174
2015/0022501 A1* 1/2015 Kita ............. G02F 1/13338
 345/174

FOREIGN PATENT DOCUMENTS

TW 201241532 10/2012
TW I389016 3/2013

* cited by examiner

TOUCH DISPLAY PANEL, TOUCH DISPLAY DEVICE AND DRIVING METHOD THEREOF

CROSS-REFERENCE TO RELATED APPLICATION

This application claims the priority benefits of U.S. provisional application Ser. No. 61/822,898, filed on May 13, 2013. The entirety of the above-mentioned patent applications is hereby incorporated by reference herein and made a part of this specification.

BACKGROUND OF THE INVENTION

1. Field of the Invention

The invention generally relates to a display panel, a display device and a driving method. More particularly, the invention relates to a touch display panel, a touch display device and a driving method 2. Description of Related Art A display apparatus having a touch-sensing function is generally implemented by a touch system and a display system independent to each other. System integration and cost reduction are unchanged developing trends of electronics industry. With progress of fabrication techniques, a touch panels is now successfully integrated with a display panel, so that a user can direct an electronic device to perform required operations through touch operations. Generally, sensing units on the touch panel and pixel units on the display panel are all arranged on a two-dimensional plane in matrices, and timings for updating frames and detecting touch points are determined according scan signals.

Generally, the touch panel has to detect an electrical difference between a touch operation and a non-touch situation. The electrical difference is generally small, so that noise interference has to be prevented. However, when the display panel is driven, scan signals, data signals and a common electrode signal are transmitted, and when these signals are varied, the touch panel is influenced. Under a developing trend that the touch panel is integrated with the display panel, interference therebetween becomes more serious.

SUMMARY OF THE INVENTION

Accordingly, the invention is directed to a touch display panel, a touch display device and a driving method which are capable of reducing the resistance-capacitance (R-C) loading, simplifying the manufacturing process and reducing the overall thickness of the touch display panel and the touch display device using the same.

An embodiment of the invention provides a touch display panel including a first substrate, a plurality of scan lines, a plurality of data lines, a second substrate, a display medium, a second electrode set and a patterned common electrode layer. The scan lines are disposed on the first substrate, and the data lines are disposed on the first substrate and arranged along a first direction. Each of the data lines crosses over the scan lines, and at least parts of the data lines form a first electrode set. The first electrode set includes a plurality of first electrode subsets. The second substrate is disposed opposite to the first substrate and having a top surface and a bottom surface opposite to the top surface. The bottom surface faces the first substrate. The display medium is sandwiched between the first substrate and the second substrate. The second electrode set is disposed on the top surface of the second substrate. The second electrode set includes a plurality of second electrode subsets arranged along a second direction intersected with the first direction. The patterned common electrode layer is disposed between the first electrode set and the second electrode set and includes a plurality of openings. An orthogonal projection of the openings on the first substrate is overlapped with an orthogonal projection of the first electrode subsets and the second electrode subsets on the first substrate.

An embodiment of the invention provides a touch display device including a touch display panel, a driving module, a sensing module and a control unit. The touch display panel includes a first substrate, a plurality of scan lines, a plurality of data lines, a plurality of active devices, a second substrate, a display medium, a second electrode set and a patterned common electrode layer. The scan lines are disposed on the first substrate, and the data lines are disposed on the first substrate and arranged along a first direction. Each of the data lines crosses over the scan lines, and at least parts of the data lines form a first electrode set. The first electrode set includes a plurality of first electrode subsets. Each of the active devices coupled to one of the scan lines and one of the data lines. The second substrate is disposed opposite to the first substrate and having a top surface and a bottom surface opposite to the top surface. The bottom surface faces the first substrate. The display medium is sandwiched between the first substrate and the second substrate. The second electrode set is disposed on the top surface of the second substrate. The second electrode set includes a plurality of second electrode subsets arranged along a second direction intersected with the first direction. The patterned common electrode layer is disposed between the first electrode set and the second electrode set and includes a plurality of openings. The first electrode subsets are exposed to the second electrode subsets through the openings. The driving module is coupled to the touch display panel and configured to provide a plurality of pixel voltages to the active devices during a display driving period in a frame period, and provide a plurality of sensing voltages to one of the first electrode set and the second electrode set during a touch sensing period in the frame period. The sensing module is coupled to the touch display panel to receive signals from the other one of the first electrode set and second electrode set. The control unit is coupled to the driving module and the sensing module and configured to control the driving module and the sensing module.

An embodiment of the invention further provides a driving method for a touch display panel. The driving method includes the following steps. A plurality of pixel voltages are provided to a plurality of active devices of the touch display panel during a display driving period in a frame period, wherein the touch display panel includes a first substrate, a second substrate opposite to the first substrate, a plurality of scan lines, a plurality of data lines disposed on the first substrate and crossing over the scan lines, a second electrode set disposed on the second substrate, and a patterned common electrode layer disposed between the first electrode set and the second electrode set and including a plurality of openings, the first electrode set is exposed to the second electrode set through the openings. One of the first electrode set and the second electrode set is driven during a touch sensing period in the frame period. A plurality of sensing signals are received from the other one of the first electrode set and second electrode set during the touch sensing period.

Based on the above description, in the embodiment of the invention, at least parts of the data lines disposed on the first substrate form the first electrode set including a plurality of first electrode subsets, and the second electrode set disposed on the second substrate includes a plurality of second electrode subsets. Accordingly, a plurality of sensing voltages are provided to one of the first electrode set and the second electrode set during the touch sensing period and causes the sensing module to receive the signals from the other one of the first electrode set and the second electrode set. Thereby, the first electrode subsets and the second electrode subsets function as touch sensing electrodes are built in the display panel, which effectively reduces overall thickness of the touch display device. Furthermore, the patterned common electrode layer disposed between the first electrode subsets and the second electrode subsets includes a plurality of openings, and the first electrode subsets are exposed to the second electrode subsets through the openings so as to reduce the R-C loading and improve the touch sensibility.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
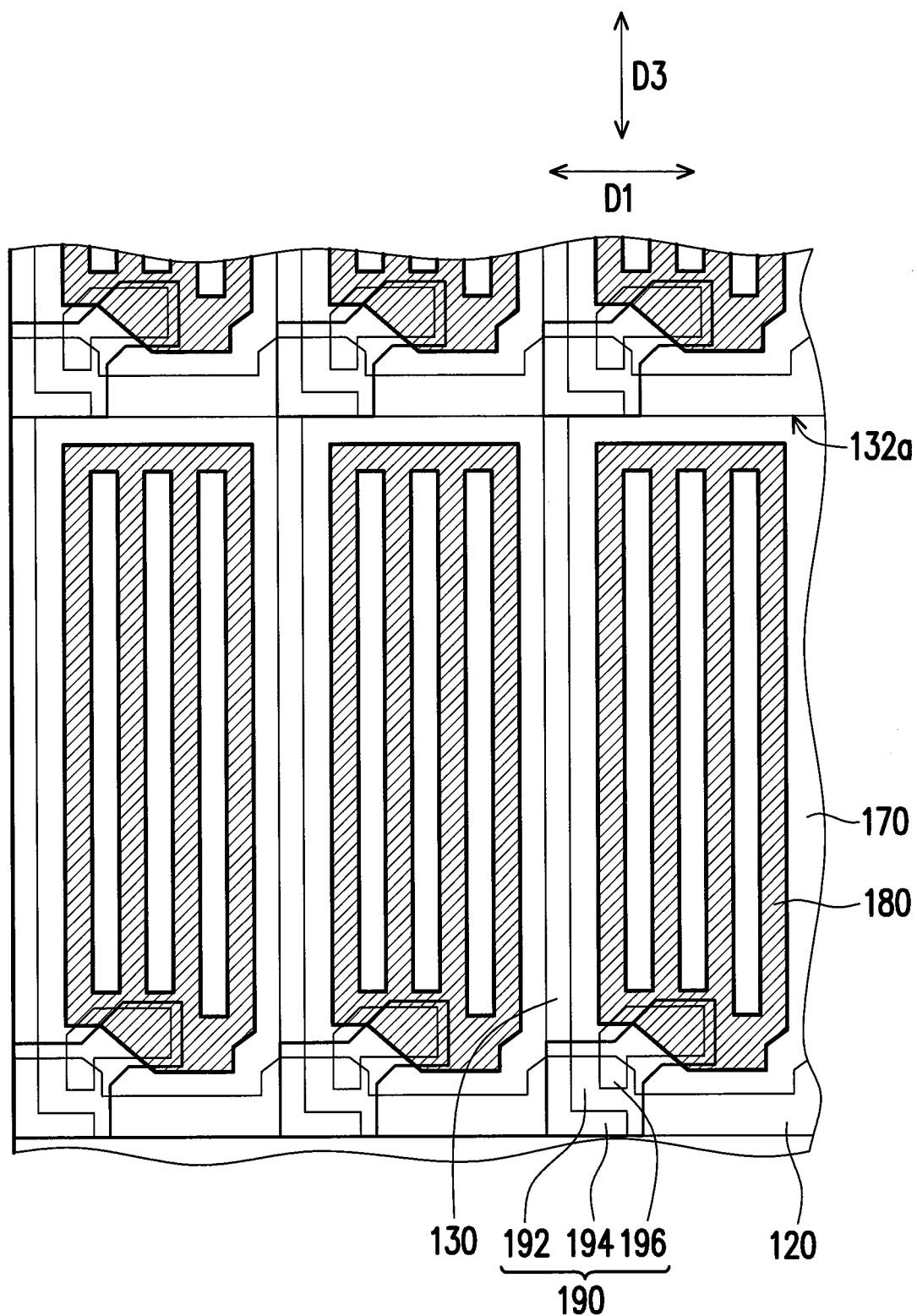
FIG. 1A illustrates a top view of partial components of a touch display panel according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Figure 1B:
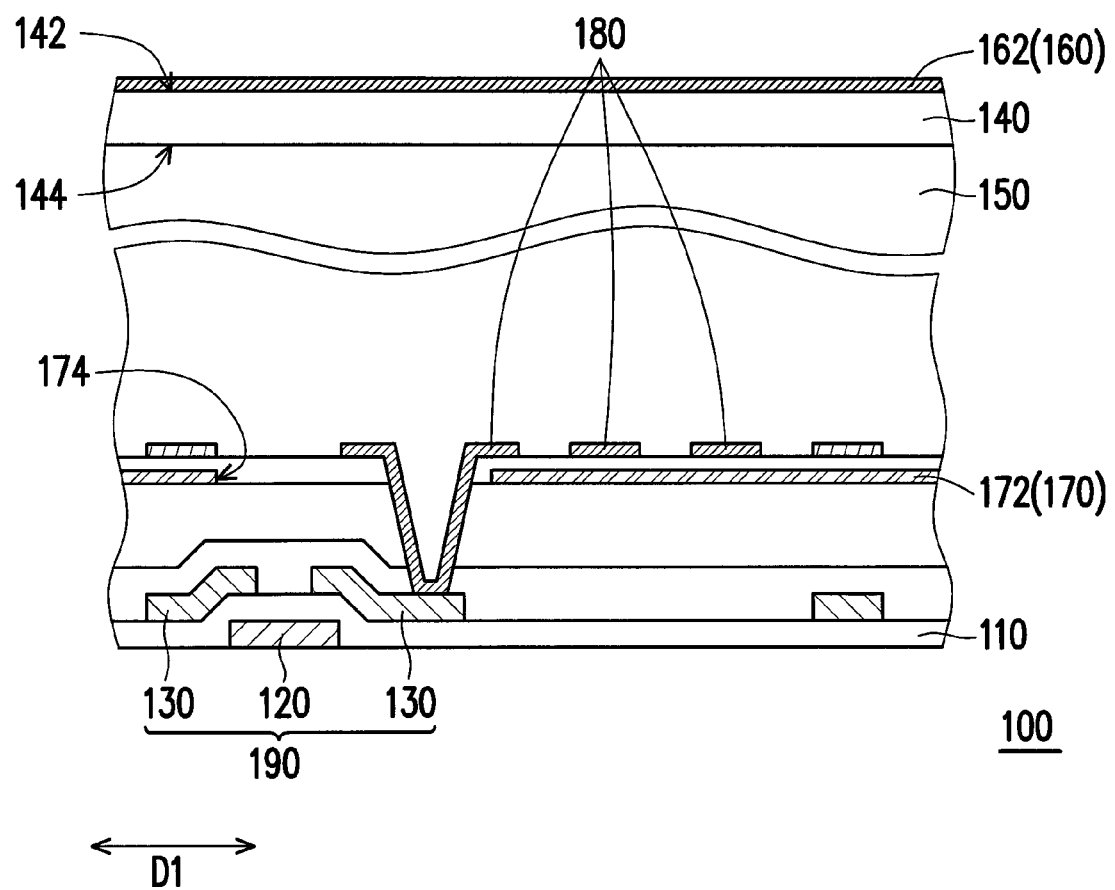
FIG. 1B illustrates a cross-sectional view of a touch display panel according to an embodiment of the invention.

FIG. 1A illustrates a top view of partial components of a touch display panel according to an embodiment of the invention. FIG. 1B illustrates a cross-sectional view of a touch display panel according to an embodiment of the invention. Referring to 1A and FIG. 1B, in the present embodiment, the touch display panel 100 includes a first substrate 110, a plurality of scan lines 120, a plurality of data lines 130, a plurality of active devices 190, a plurality of pixel electrodes 180, a second substrate 140, a display medium 150, a second electrode set 160 and a patterned common electrode layer 170. Each of the active devices 190 is coupled to one of the scan lines 120 and one of the data lines 130. In detail, each of the active devices 190 includes a gate 192 connected to one of the scan lines 120, a source 194 connected to one of the data lines 130, and a drain 196 connected to one of the pixel electrodes 180. In the present embodiment, the active devices 190 are thin film transistors (TFTs). The active devices 190 are in "ON" state during a display driving period in a frame period. As such, a plurality of pixel voltages are respectively provided to the pixel electrodes 180 by turns through the active devices 190 during the display driving period. The active devices 190 are in "OFF" state during a touch sensing period in the frame period. The scan lines 120 and the data lines 130 are disposed on the first substrate 110. The data lines 130 are arranged along a first direction D1, wherein each of the data lines 130 crosses over all the scan lines 120 as shown in FIG. 1A.

Moreover, the second substrate 140 is disposed opposite to the first substrate 110 and has a top surface 142 and a bottom surface 144 opposite to the top surface 142. The bottom surface 144 faces the first substrate 110. The display medium 150 is sandwiched between the first substrate 110 and the second substrate 140. The second electrode set 160 is disposed on the top surface 142 of the second substrate 140. In the present embodiment, the second substrate 140 is, for example, a color filter substrate, and the second electrode set 160 may be an electrostatic discharge (ESD) protection layer disposed on the top surface 142 of the second substrate 140 to prevent the circuits of the touch display panel 100 from being damaged by discharging electrostatic charges.

Figure 2A:
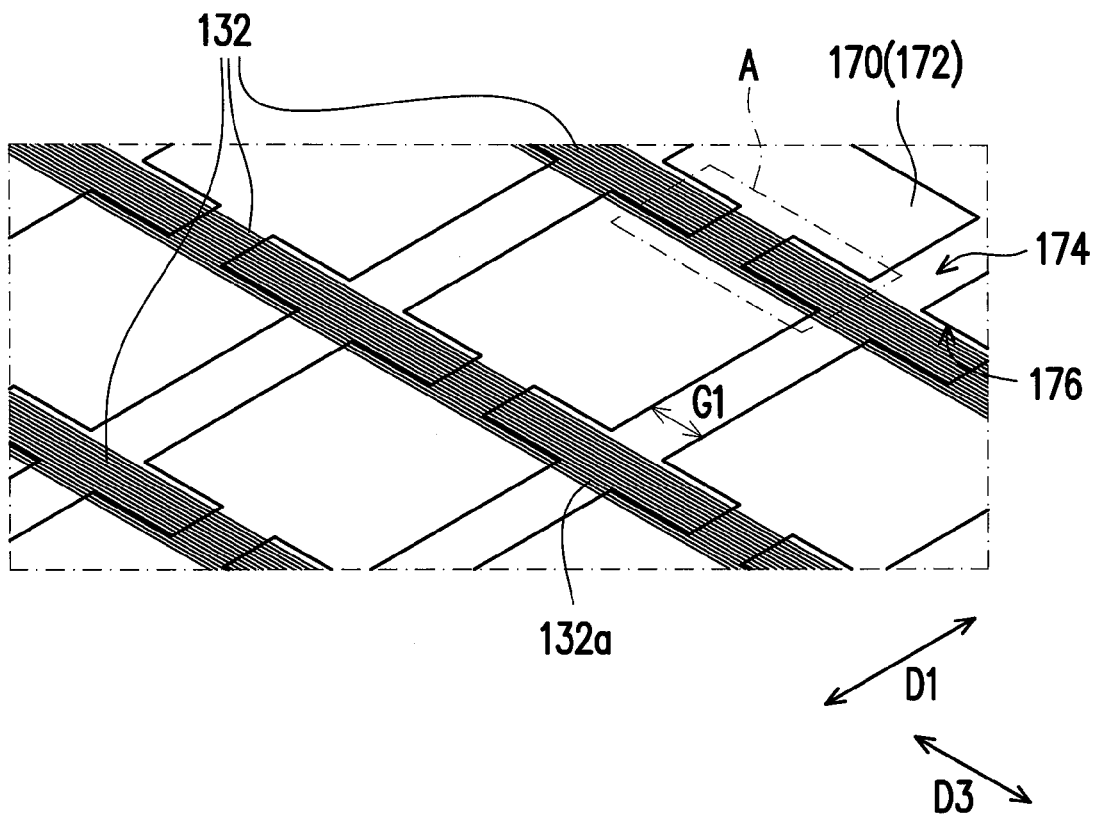
FIG. 2A illustrates a schematic partial view of a touch display panel according to an embodiment of the invention.
Figure 2B:
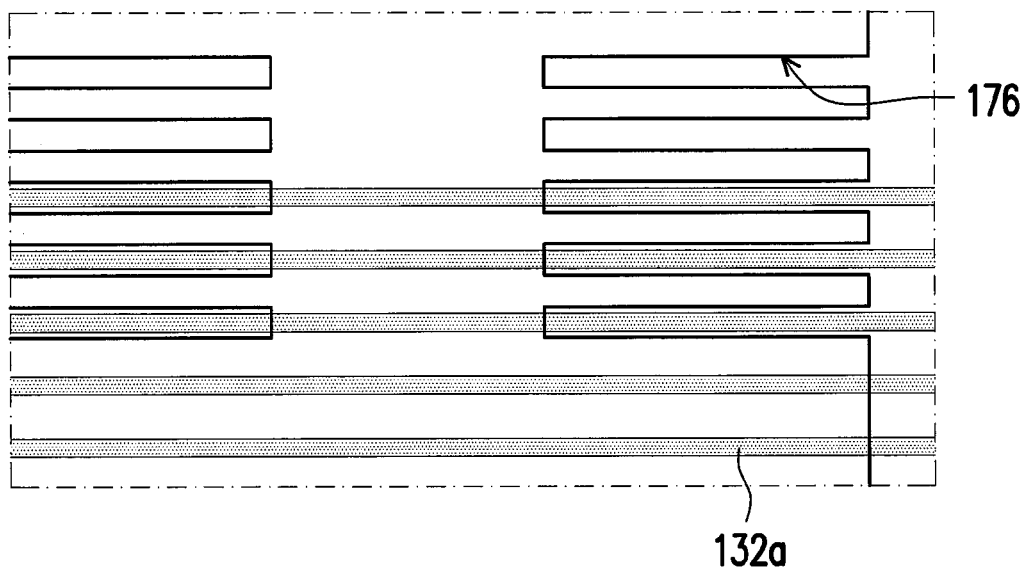
FIG. 2B illustrates a partial-enlarged view of the touch display panel in FIG. 2A.
Figure 3:
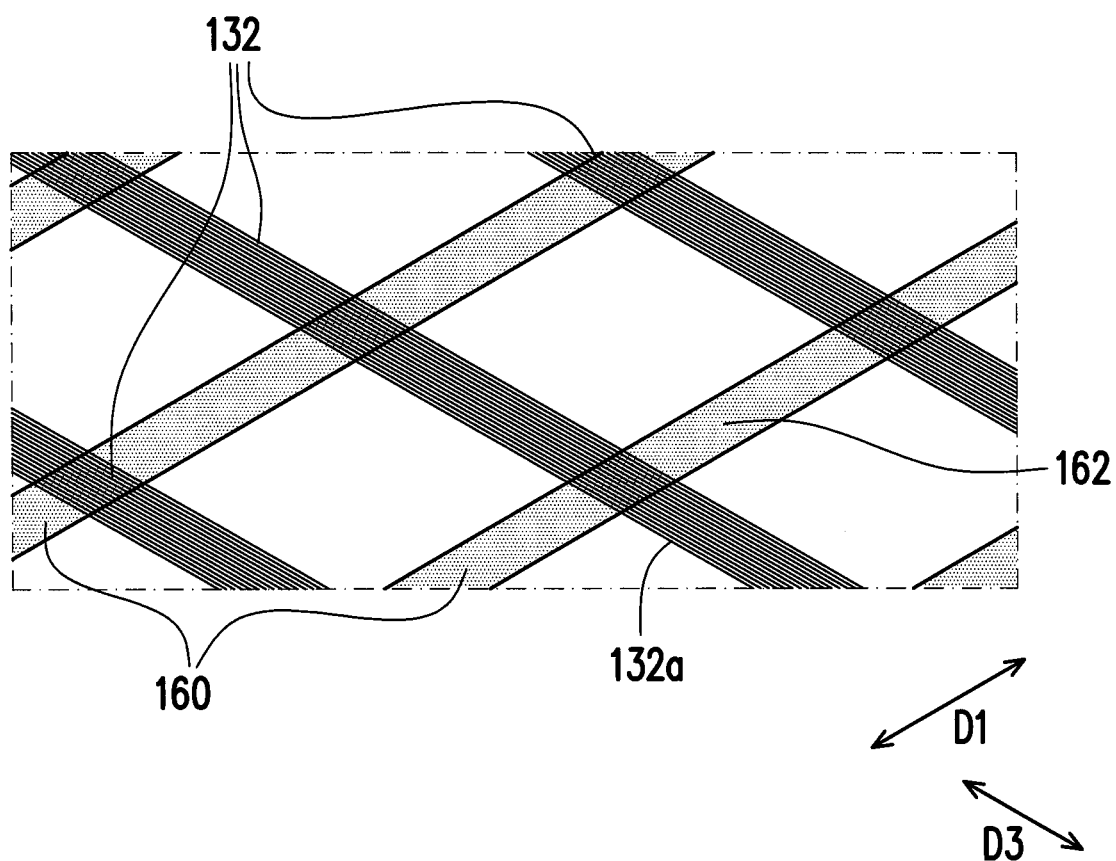
FIG. 3 illustrates a schematic partial view of a touch display panel according to an embodiment of the invention.

FIG. 2A illustrates a schematic partial view of a touch display panel according to an embodiment of the invention. FIG. 2B illustrates a partial-enlarged view of the touch display panel in FIG. 2A. FIG. 3 illustrates a schematic partial view of a touch display panel according to an embodiment of the invention. It is noted that, for clarity of illustration, only the patterned common electrode layer 170 and the parts of the data lines 130 forming the first electrode set 132 are shown in FIG. 2A, and the rest of the data lines 130 arranged along the first direction D1 and located between the first electrode subsets 132a are omitted herein. Also, only the first electrode set 132 and the second electrode set 160 are shown in FIG. 3 for clarity of illustration. Referring to FIG. 2A to FIG. 3, the data lines 130 are arranged along the first direction D1 and at least parts of the data lines 130 form a first electrode set 132 (In this embodiment, parts of the data lines 130 form the first electrode set 132 as shown in FIG. 2A). The first electrode set 132 includes a plurality of first electrode subsets 132a. The second electrode set 160 includes a plurality of second electrode subsets 162 arranged along a second direction (not shown) intersected with the first direction D1. In the present embodiment, the first electrode subsets 132a may also function as the transmitters during the touch sensing period, and the second electrode subsets 162 may function as the receivers during the touch sensing period. In general, the transmitter is an electrode for transmitting a touch sensing signal, and the receiver is an electrode for sensing the touch sensing signal. That is, in the present embodiment, a plurality of touch sensing signals are respectively provided to the first electrode subsets 132a by turns, and the second electrode subsets 162 sense the touch sensing signals respectively. Of course, the invention is not limited thereto. In other embodiment, the second electrode subsets 162 may function as the transmitters and the first electrode subsets 132a may function as the receivers during the touch sensing period.

In addition, the patterned common electrode layer 170 is disposed between the first electrode set 132 and the second electrode set 162 and includes a plurality of openings 174. An orthogonal projection of the openings 174 on the first substrate 110 is overlapped with an orthogonal projection of the first electrode subsets 132a and the second electrode subsets 162 on the first substrate 110. In other words, the first electrode subsets 132a are exposed to the second electrode subsets 162 through the openings 174, so as to reduce the R-C loading of the touch display circuits and improve the touch sensing sensibility.

To be more specific, the patterned common electrode layer 170 includes a plurality of common electrodes 172 arranged along a third direction D3. In the present embodiment, the third direction D3 may be parallel to the second direction intersected with the first direction D1 as shown in FIG. 2A. The openings 174 includes a plurality of gaps G1 existing between the common electrodes 172. An orthogonal projection of the gaps G1 on the first substrate 110 is overlapped with the orthogonal projection of the first electrode subsets 132a and the second electrode subsets 162 on the first substrate 110. In detail, an edge of each of the common electrodes 172 includes a plurality of concaves 176, and each of the concaves 176 is in comb-shaped corresponding to the first substrate subsets 132a as shown in FIG. 2B, such that the first substrate subsets 132a are exposed to the second electrode subsets 162 through the comb-shaped concaves 176 so as to improve the touch sensing sensibility.

In the present embodiment, a plurality of pixel voltage are respectively provided to the active devices 190 by turns during the display driving period in the frame time, and a plurality of sensing voltages are respectively provided to the first electrode subsets 132a by turns during the touch sensing period in the frame time, such that the first electrode subsets 132a may function as the transmitter during the touch sensing period, and the second electrode subsets 162 function as the receiver during the touch sensing period. Of course, in other embodiment, the sensing voltages may be respectively provided to the second electrode subsets 162 by turns, such that the second electrode subsets 162 function as the transmitter and the first electrode subsets 132a function as the receiver during the touch sensing period. In addition, a reference voltage may be provided to the patterned common electrode layer 170 during the display driving period, and the patterned common electrode layer 170 may be floating during the touch sensing period. In other embodiment, the reference voltage may be provided to the patterned common electrode layer 170 constantly.

Figure 4:
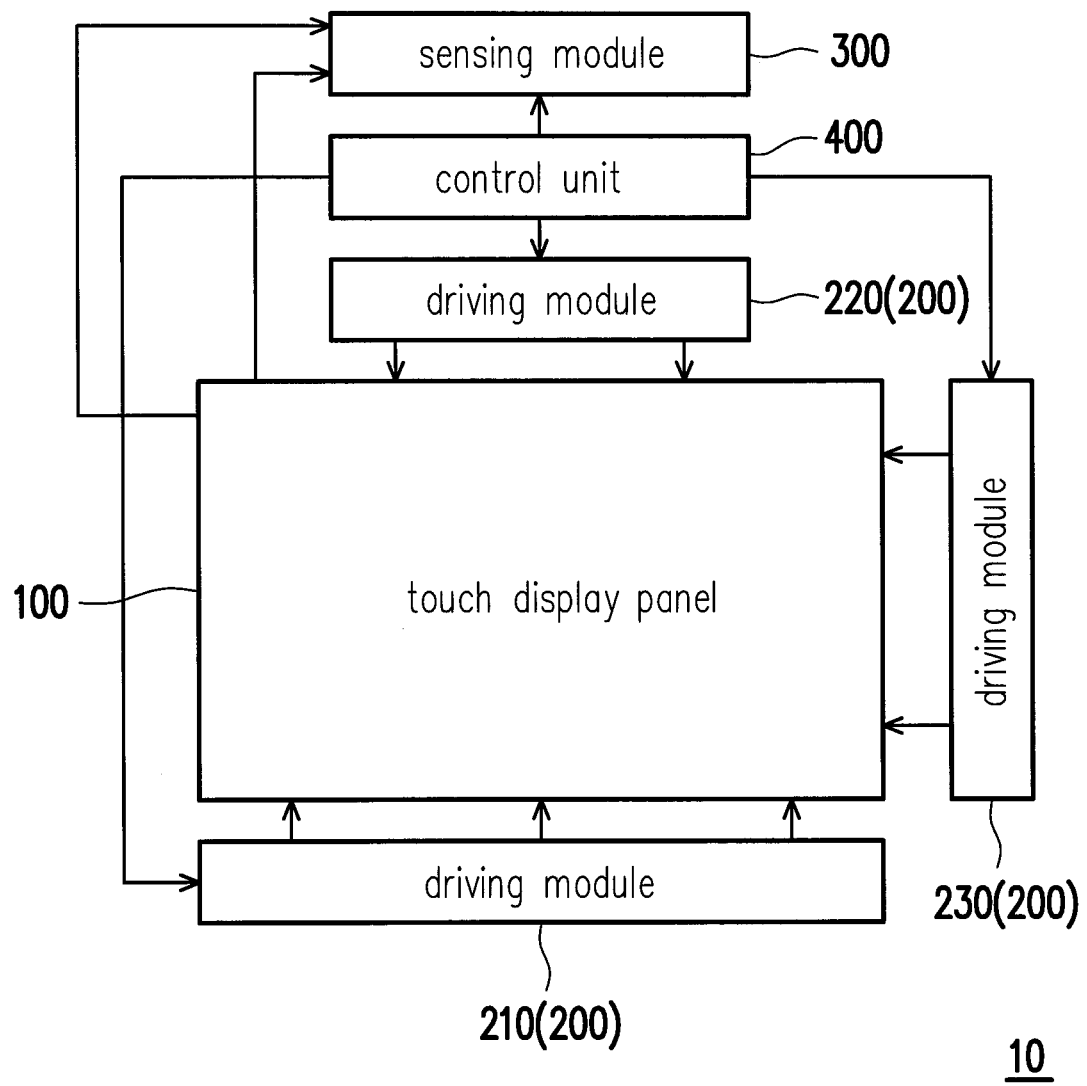
FIG. 4 illustrates a touch display device according to an embodiment of the invention.

FIG. 4 illustrates a touch display device according to an embodiment of the invention. Referring to FIG. 1B and FIG. 4, the touch display device 10 of the present embodiment includes a touch display panel 100 as shown in FIG. 1B, a driving module 200, a sensing module 300 and a control unit 400. It is noted that the touch display device 10 in FIG. 6 adopts the touch display panel 100 in FIG. 1B. Therefore, for purpose of clarity and simplicity, detail description of same or similar features may be omitted herein. In the present embodiment, the driving module 200 is coupled to the touch display panel 100 and configured to provide the pixel voltages to the active devices 190 during the display driving period in the frame period, and provide the sensing voltages to one of the first electrode set 132 and the second electrode set 160 during the touch sensing period in the frame period. The driving module 200 may includes a plurality of drivers. In detail, the driving module 200 may includes a common electrode driver 210 coupled to the common electrode 140, a gate driver 220 coupled to the scan lines 124, and a source driver 230 coupled to the data lines 126, but, of course, the invention is not limited thereto. The sensing module 300 is coupled to the touch display panel 100 to receive signals from the other one of the first electrode set 132 and the second electrode set 160. The control unit 400 is coupled to the driving module 200 and the sensing module 300 and configured to control the driving module 200 and the sensing module 300.

Figure 5:
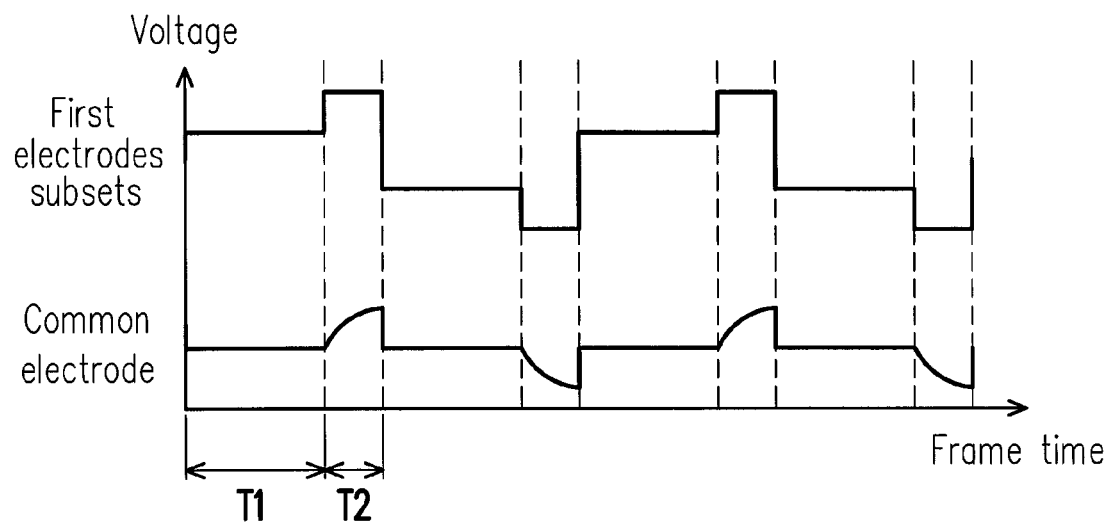
FIG. 5 and FIG. 6 illustrate different driving methods of a touch display device according to different embodiments of the invention.
Figure 6:
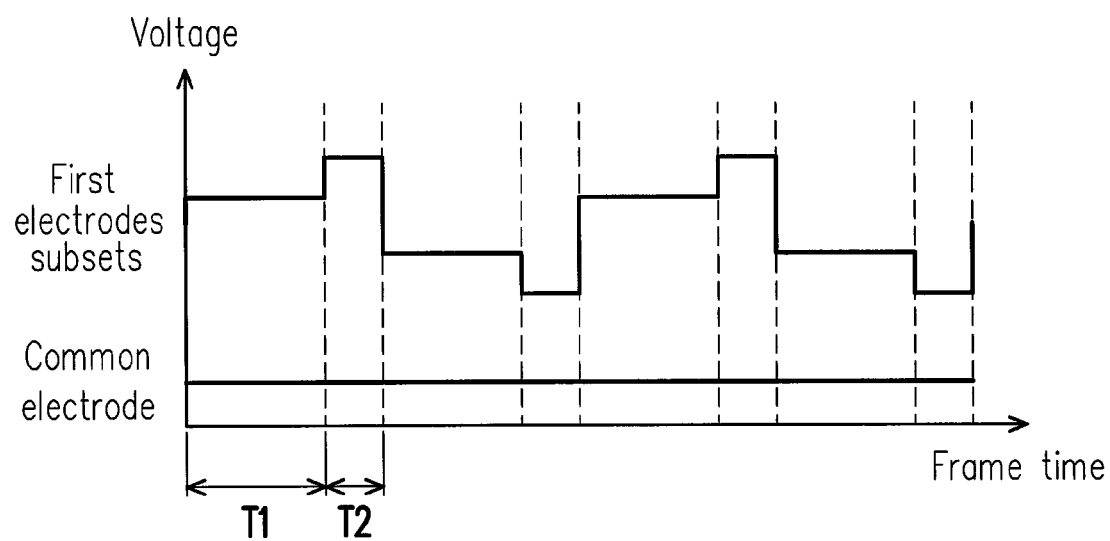

FIG. 5 and FIG. 6 illustrate different driving methods of a touch display device according to different embodiments of the invention. Accordingly, a driving method applicable for the touch display device 10 described above is developed. Referring to FIG. 4 to FIG. 6, the driving method includes the following steps: firstly, a plurality of pixel voltages are provided to the active devices 190 of the touch display panel 100 as shown in FIG. 1B during a display driving period in a frame period. Next, one of the first electrode set 132 and the second electrode set 160 are driven during a touch sensing period in the frame period. Then, a plurality of sensing signals are received from the other one of the first electrode set 132 and second electrode set 160 during the touch sensing period.

To be more specific, referring to FIG. 4 and FIG. 5, the control unit 400 is coupled to the driving module 200 and the sensing module 300. As such, the control unit 400 causes the driving module 200 to provide the pixel voltages to the active devices 190 coupled to the data lines 130 during the display driving period T1 in the frame period, and to stop providing the pixel voltages to the active devices 190 during the touch sensing period. The control unit 400 also causes the driving module 200 to provide the sensing voltages to one of the first electrode set 132 and the second electrode set 160 during the touch sensing period T2 in the frame period. The control unit 400 further causes the sensing module 300 to receive the signals from the other one of the first electrode set 132 and the second electrode set 160. Also, the control unit 400 causes the driving module 200 to provide a reference voltage to the common electrodes 172 during the display driving period T1.

In the present embodiment, the control unit 400 causes the driving module 200 to provide the sensing voltages to the first electrode set 132 during the touch sensing period T2, and the control unit 400 causes the sensing module 300 to receive the signals from the second electrode set 160. That is, the first electrode subsets 132a of the first electrode set 130 function as the transmitters during the touch sensing period T2, and the second electrode subsets 162 of the second electrode set 160 function as the receivers during the touch sensing period T2. Also, the control unit 400 causes the driving module 200 to provide a reference voltage to the common electrodes 172 during the display driving period T1, and causes the driving module 200 to stop providing the reference voltage to the common electrodes 172 during the touch sensing period T2, such that the common electrodes 172 are coupled to the first electrode subsets 132a during the touch sensing period T2.

Of course, in other embodiment, the second electrode subsets 162 may also function as the transmitters, and the first electrode subsets 132a function as the receivers during the touch sensing period T2, which means the control unit 400 causes the driving module 200 to provide the sensing voltages to the second electrode subsets 162, and causes the sensing module 300 to receive the signals from the first electrode subsets 132a during the touch sensing period T2.

Referring to FIG. 4 and FIG. 6, in the present embodiment, similar to the previous embodiment, the control unit 400 causes the driving module 200 to provide the pixel voltages to the active devices 190 during the display driving period T1, and respectively provide the sensing voltages to the first electrode subsets 132a (or the second electrode subsets 162) by turns during the touch sensing period T2 as shown in FIG. 6. The control unit 400 further causes the sensing module 300 to receive the signals from the second electrode subsets 162 (or the first electrode subsets 132a) during the touch sensing period T2. In the present embodiment, the control unit 400 causes the driving module 200 to provide a reference voltage to the common electrodes 172 constantly.

In sum, at least parts of the data lines disposed on the first substrate form the first electrode set including a plurality of first electrode subsets, and the second electrode set including a plurality of second electrode subsets is disposed on the second substrate as an ESD protection layer. In addition, a plurality of sensing voltages are provided to one of the first electrode subsets and the second electrode set during the touch sensing period and causes the sensing module to receive the signals from the other one of the first electrode subsets and the second electrode set. Thereby, the first electrode subsets and the second electrode subsets function as the touch sensing electrodes are built in the display panel, which effectively reduces overall thickness of the touch display device. Furthermore, the patterned common electrode layer disposed between the first electrode subsets and the second electrode subsets includes a plurality of openings, and the first electrode subsets are exposed to the second electrode subsets through the openings so as to reducing the R-C loading and improve the touch sensibility.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A touch display panel, comprising:
   a first substrate;
   a plurality of scan lines, disposed on the first substrate;
   a plurality of data lines, disposed on the first substrate and arranged along a first direction, each of the data lines crossing over the scan lines, and at least parts of the data lines forming a first electrode set, the first electrode set comprising a plurality of first electrode subsets for transmitting or receiving a plurality of touch sensing signals;
   a second substrate, disposed opposite to the first substrate and having a top surface and a bottom surface opposite to the top surface, the bottom surface facing the first substrate;
   a display medium, sandwiched between the first substrate and the second substrate;
   a second electrode set, disposed on the top surface of the second substrate, the second electrode set comprising a plurality of second electrode subsets arranged along a second direction intersected with the first direction; and
   a patterned common electrode layer, disposed between the first electrode set and the second electrode set and comprising a plurality of openings, wherein an orthogonal projection of the openings on the first substrate is overlapped with an orthogonal projection of the first electrode subsets on the first substrate, and is overlapped with an orthogonal projection of the second electrode subsets on the first substrate.

2. The touch display panel as claimed in claim 1, wherein a plurality of pixel voltage are respectively provided to the active devices by turns during a display driving period in a frame time, and a plurality of sensing voltages are respectively provided to the first electrode subsets by turns during a touch sensing period in the frame time.

3. The touch display panel as claimed in claim 1, wherein a plurality of sensing voltages are respectively provided to the second electrode subsets by turns during a touch sensing period in a frame time.

4. The touch display panel as claimed in claim 1, wherein a reference voltage is provided to the patterned common electrode layer during a display driving period.

5. The touch display panel as claimed in claim 1, wherein a reference voltage is provided to the patterned common electrode layer constantly.

6. The touch display panel as claimed in claim 1, wherein the patterned common electrode layer comprises a plurality of common electrodes arranged along a third direction, the openings comprising a plurality of gaps existing between the common electrodes, and an orthogonal projection of the gaps on the first substrate is overlapped with the orthogonal projection of the first electrode subsets and the second electrode subsets on the first substrate.

7. The touch display panel as claimed in claim 6, wherein the third direction is parallel to the second direction.

8. The touch display panel as claimed in claim 6, wherein an edge of each of the common electrodes comprises a plurality of concave portions, each of the concave portions is in comb-shaped corresponding to the first substrate subsets.

9. A touch display device, comprising:
   a touch display panel, comprising:
   a first substrate;
   a plurality of scan lines, disposed on the first substrate;
   a plurality of data lines, disposed on the first substrate and arranged along a first direction, each of the data lines crossing over the scan lines, and at least parts of the data lines forming a first electrode set, the first electrode set comprising a plurality of first electrode subsets;
   a plurality of active devices, each of the active devices coupled to one of the scan lines and one of the data lines;
   a second substrate, disposed opposite to the first substrate and having a top surface and a bottom surface opposite to the top surface, the bottom surface facing the first substrate;
   a display medium, sandwiched between the first substrate and the second substrate;
   a second electrode set, disposed on the top surface of the second substrate, the second electrode set comprising a plurality of second electrode subsets arranged along a second direction intersected with the first direction; and
   a patterned common electrode layer, disposed between the first electrode set and the second electrode set and comprising a plurality of openings, wherein an orthogonal projection of the openings on the first substrate is overlapped with an orthogonal projection of the first electrode subsets on the first substrate, and is overlapped with an orthogonal projection of the second electrode subsets on the first substrate;
   a driving module, coupled to the touch display panel and configured to provide a plurality of pixel voltages to the active devices during a display driving period in a frame period, and provide a plurality of sensing voltages to one of the first electrode set and the second electrode set during a touch sensing period in the frame period;
   a sensing module, coupled to the touch display panel to receive signals from the other one of the first electrode set and second electrode set; and
   a control unit, coupled to the driving module and the sensing module and configured to control the driving module and the sensing module.

10. The touch display device as claimed in claim 9, wherein the control unit causes the driving module to respectively provide the pixel voltages to the active devices by turns during the display driving period and to stop providing the pixel voltages to the active devices during the touch sensing period.

11. The touch display device as claimed in claim 9, wherein the control unit causes the driving module to respectively provide the sensing voltages to the first electrode subsets by turns during the touch sensing period, and causes the sensing module to receive signals from the second electrode subsets.

12. The touch display device as claimed in claim 9, wherein the control unit causes the driving module to respectively provide the sensing voltages to the second electrode subsets by turns during the touch sensing period, and causes the sensing module to receive signals from the first electrode subsets.

13. The touch display device as claimed in claim 9, wherein the patterned common electrode layer comprises a plurality of common electrodes, and the control unit causes the driving module to provide a reference voltage to the common electrodes during the display driving period.

14. The touch display device as claimed in claim 9, wherein the patterned common electrode layer comprises a plurality of common electrodes, and the control unit causes the driving module to provide a reference voltage to the common electrodes constantly.

15. The touch display panel as claimed in claim 9, wherein the patterned common electrode layer comprises a plurality of common electrodes arranged along a third direction, the openings comprising a plurality of gaps existing between the common electrodes, and an orthogonal projection of the gaps on the first substrate is overlapped with an orthogonal projection of the first electrode subsets and the second electrode subsets on the first substrate.

16. The touch display device as claimed in claim 15, wherein the third direction is parallel to the second direction.

17. The touch display device as claimed in claim 15, wherein an edge of each of the common electrodes comprises a plurality of concave portions, each of the concave portions is in comb-shaped corresponding to the first substrate subsets.

18. A driving method for a touch display panel, comprising:
providing a plurality of pixel voltages to a plurality of active devices of the touch display panel during a display driving period in a frame period, wherein the touch display panel comprises a first substrate, a second substrate opposite to the first substrate, a plurality of scan lines, a plurality of data lines disposed on the first substrate and crossing over the scan lines, and at least parts of the data lines forming a first electrode set, a second electrode set disposed on the second substrate, and a patterned common electrode layer disposed between the first electrode set and the second electrode set and comprising a plurality of openings, wherein an orthogonal projection of the openings on the first substrate is overlapped with an orthogonal projection of the first electrode subsets on the first substrate, and is overlapped with an orthogonal projection of the second electrode subsets on the first substrate;
driving one of the first electrode set and the second electrode set during a touch sensing period in the frame period; and
receiving a plurality of sensing signals from the other one of the first electrode set and second electrode set during the touch sensing period.

19. The driving method as claimed in claim 18, further comprising:
stopping to provide the pixel voltages to the active devices during the touch sensing period.

20. The driving method as claimed in claim 18, wherein the patterned common electrode layer comprises a plurality of common electrodes, and the driving method further comprises providing a plurality of reference voltages respectively to the common electrodes during the display driving period.

21. The driving method as claimed in claim 18, wherein the patterned common electrode layer comprises a plurality of common electrodes, and the driving method further comprises providing a plurality of reference voltages respectively to the common electrodes constantly.

22. The driving method as claimed in claim 18, wherein the step of driving one of first electrode set and the second electrode set during the touch sensing period comprising:
providing a plurality of sensing voltages respectively to the first electrode subsets by turns during the touch sensing period.

23. The driving method as claimed in claim 22, wherein the step of receiving the sensing signals from the other one of the first electrode set and second electrode set during the touch sensing period comprises:
receiving the sensing signals respectively from the second electrode subsets during the touch sensing period.

* * * * *